April 13, 1954

C. E. ELLIS 2,675,494

ADJUSTABLE POLE PITCH DYNAMOELECTRIC MACHINERY

Filed Nov. 20, 1951

INVENTOR
CHARLES E. ELLIS
BY
*Campbell, Brumbaugh, Free & Graves*
his ATTORNEYS.

April 13, 1954  C. E. ELLIS  2,675,494
ADJUSTABLE POLE PITCH DYNAMOELECTRIC MACHINERY
Filed Nov. 20, 1951  3 Sheets-Sheet 3
FIG. 3.
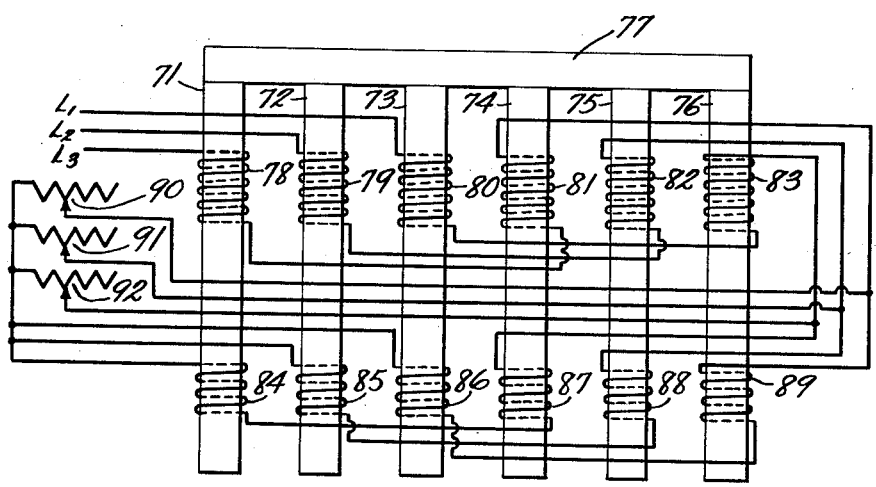
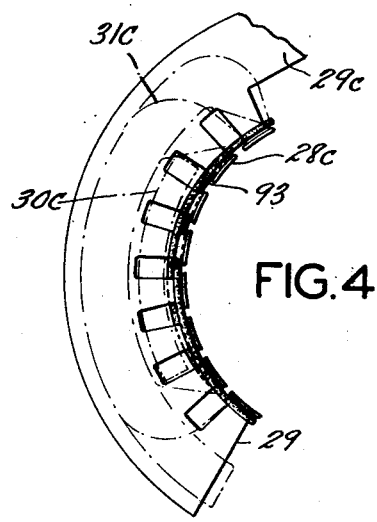
FIG. 4.
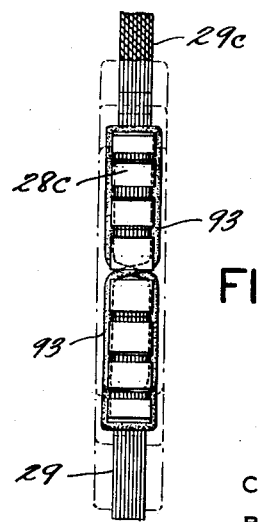
FIG. 5.
INVENTOR
CHARLES E. ELLIS
BY
ATTORNEYS Patented Apr. 13, 1954

2,675,494

UNITED STATES PATENT OFFICE 2,675,494

ADJUSTABLE POLE PITCH DYNAMO-ELECTRIC MACHINERY

Charles E. Ellis, Mahwah, N. J.

Application November 20, 1951, Serial No. 257,216

12 Claims. (Cl. 310—166)

This invention relates to alternating current dynamoelectric machinery. More specifically, it has to do with new and improved adjustable pole pitch dynamo electric machinery that can be operated as an adjustable speed induction motor with greater effectiveness and better efficiency than has been attainable previously.

It has been proposed, heretofore, to secure adjustable speed motor operation of alternating current dynamoelectric machinery by providing means for adjusting the pitch between the several poles thereof. My Patent No. 2,470,767, issued May 24, 1949, for example, discloses apparatus of this type in which axially extending rows of poles are provided at different positions around the rotor, together with means for skewing each row of poles around the rotor to adjust the pole pitch. While such apparatus is effective, it tends to be heavier than conventional motor apparatus of the same power rating because of the additional iron laminations required to provide paths for the axial and transverse magnetic fluxes that are developed in the rotor. Further, since the several rows of poles are not magnetically independent, the rotating field developed contains undesirable components which act at speed settings below full speed to reduce the operating efficiency.

My copending application Serial No. 158,492, filed April 27, 1950, for "Adjustable Pole Pitch Dynamo Electric Machine" discloses several further modifications utilizing a plurality of magnetically independent, multipole field structures which provide only transverse paths for magnetic flux in the rotor, axial magnetic flux being substantially eliminated. Motors of this type may be appropriately termed "cross-flux" motors. In the absence of axial flux, no additional iron or special laminations for an axial flux path are needed, so that a simpler and less expensive construction results. While apparatus of this character is also effective, its efficiency is inherently lower at low speed settings than that for machinery designed according to the present invention.

Accordingly, it is the purpose of the present invention to provide alternating current dynamoelectric apparatus capable of effective operation as an adjustable speed motor, which is simple and relatively inexpensive in construction yet efficient in operation. Broadly speaking, this is accomplished by disposing a plurality of magnetic poles in a row extending axially of the rotor, the pole faces facing the rotor and being spaced therefrom by a relatively narrow air gap. The poles in the row are axially yoked together and axial magnetic yoke means is also provided for the rotor. Further, the magnetic poles are mounted for relative movement transversely of the row to permit adjustment of the pole pitch over a range wide enough to secure the range of speed control desired.

Preferably, a plurality of rows of axially yoked magnetic poles are employed, the several rows being angularly spaced apart about the rotor. In such case, provision is made for relatively wide air gaps between corresponding poles in the plurality of rows to insure substantial magnetic independence between each axially extending stator yoke with its associated poles and the others. The rotor axial magnetic yoke means, however, is common to all of the magnetic poles in the machine.

With this construction, axial magnetic flux flows under the rotor windings and only the useful amount of annular magnetic flux is developed in the rotor. Hence, motors of this type may conveniently be designated "axial-flux" motors. In such motors, the production of undesired components in the rotating magnetic field is inhibited and the rotary space rate of all field components, including both the rotary resultant field rate and the average rate is adjustable, resulting in the equivalent of an adjustable frequency field when viewed from the rotor. Furthermore, in the axial flux motor, the field flux couples or links only that annular portion of the rotor winding lying between and under the phase poles of each row, whereas in the cross-flux motor, each phase ring links the entire rotor in a fixed inductive coupling regardless of the positions of the phase poles relative to each other. As a result, the axial flux motor has improved operating characteristics and good efficiency.

Additional objects and advantages of the invention will be apparent from the following detailed description of a representative embodiment, taken in conjunction with the accompanying drawings in which:

Fig. 3 is a schematic developed view of a modification embodying means for substantially neutralizing any negative sequence stator field component; and Figs. 4 and 5 show schematically means for compensating for magnetic leakage in the machine of Figs. 1 and 2.

Figure 1:
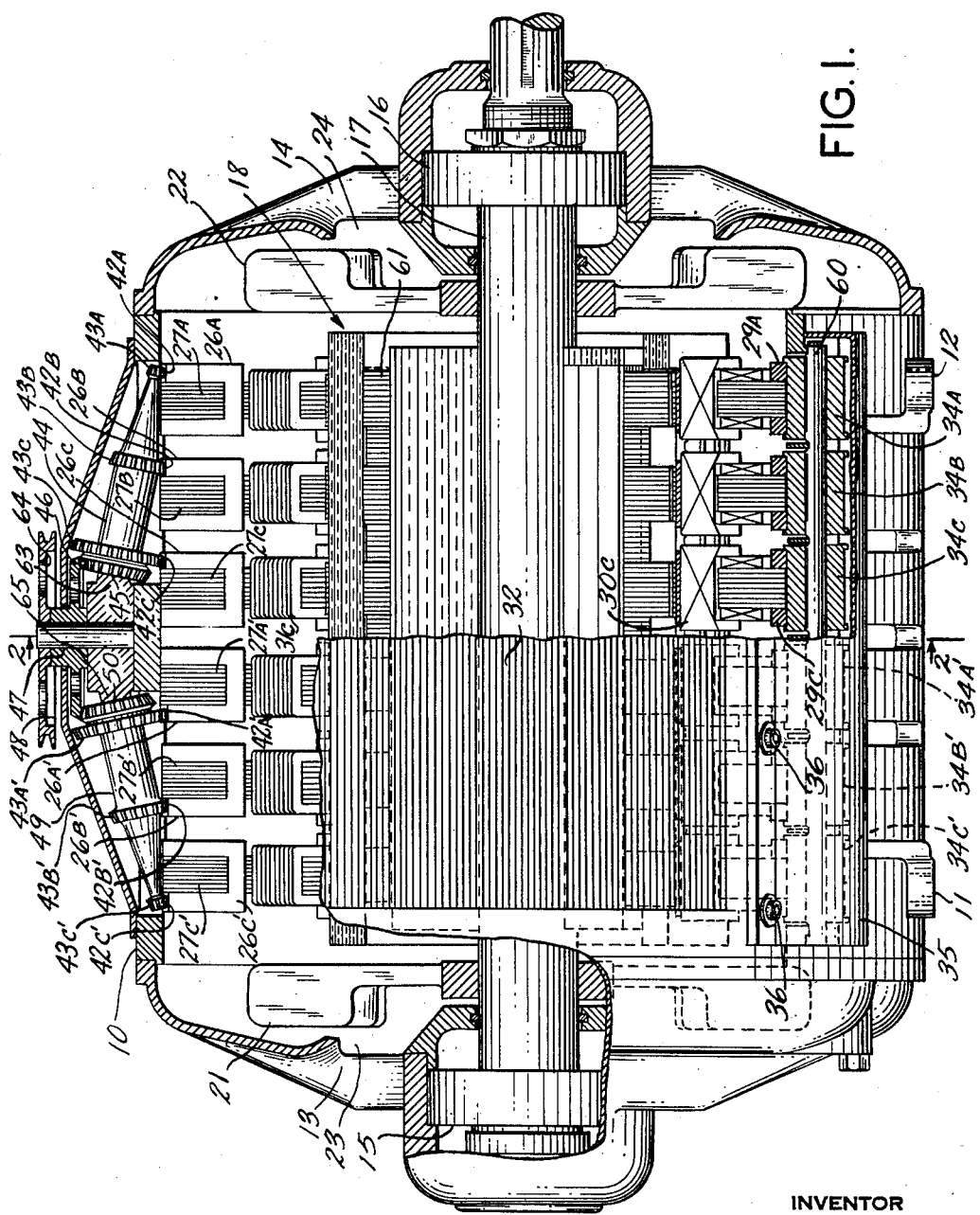
Fig. 1 is a view in elevation, partially in longitudinal section, of an alternating current dynamoelectric machine constructed according to the invention.
Figure 2:
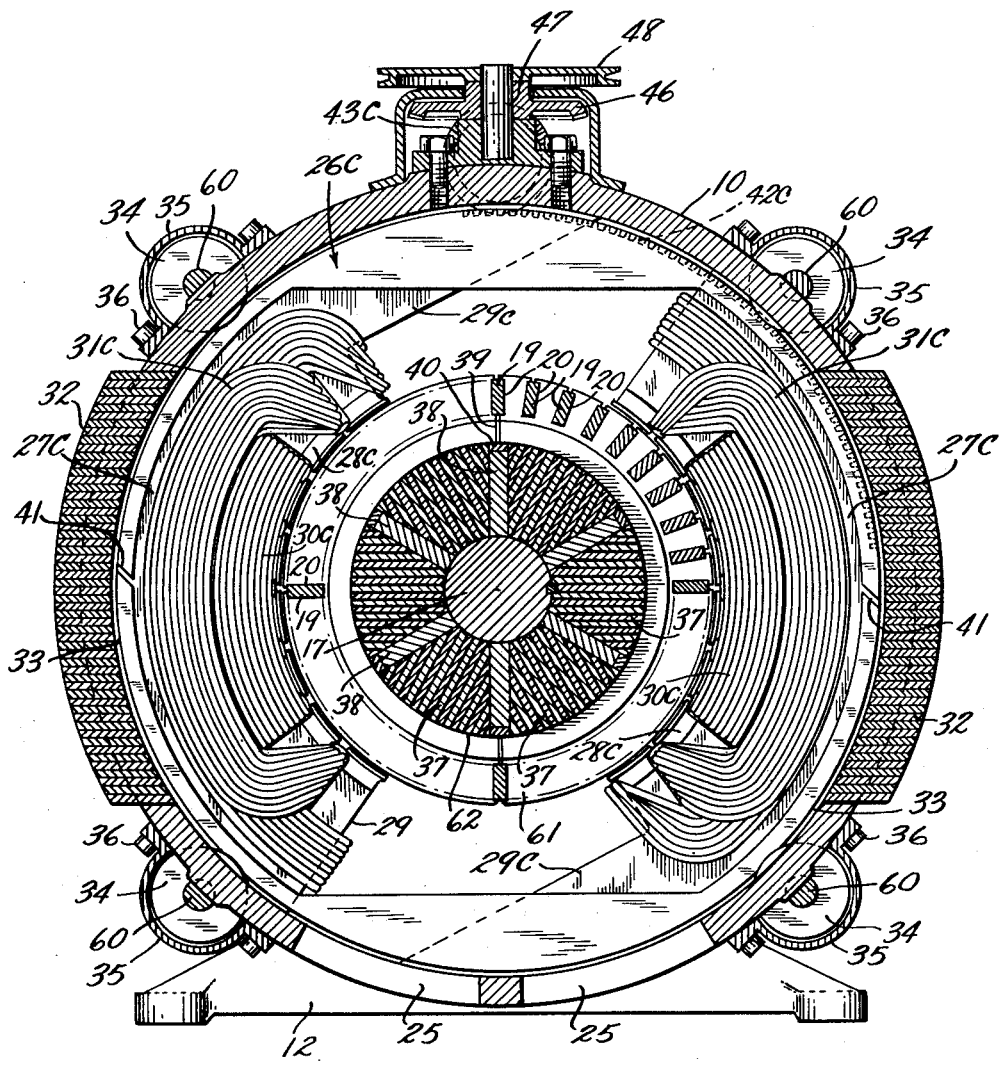
Fig. 2 is a view in transverse section taken along line 2—2 of Fig. 1, looking in the direction of the arrows.

The typical embodiment shown in Figs. 1 and 2 by way of illustration comprises a housing 10, preferably of nonmagnetic material, mounted on suitable base members 11 and 12 and having end bells 13 and 14 secured thereto by bolts, for example. The end bells 13 and 14 carry conventional bearings 15 and 16 in which is journalled a shaft 17 carrying a rotor 18. The rotor 18 may be of the squirrel cage induction motor type comprising a plurality of parallel conductors 19 embedded in slots 20 and insulated throughout their lengths therefrom, although a conventional wound rotor may be employed. Mounted on the shaft 17 are conventional fan blades 21 and 22 which are adapted to cooperate with openings 23 and 24 formed in the end bells 13 and 14, respectively, and with slots 25 (Fig. 2) formed in the housing 10 to insure proper ventilation and cooling of the motor.

Within the housing 10 and spaced from the rotor 18 by an air gap are a plurality of ring-like members 26A, 26B, 26C, 26A', 26B' and 26C' of channel shaped cross-section and made of nonmagnetic material each of which carries a plurality of magnetic pole members. Two such pole members disposed 180° apart are shown in the exemplary form of the invention illustrated in Fig. 1. Since the ring-like members are identical, it will be necessary to describe only one in detail, corresponding parts in the others being designated by corresponding reference numerals with appropriate letters.

The ring-like member 26C has secured thereto two magnetic members 27C, each including a pole piece 28C and a horn-like member 29C. The pole pieces 28C carry energizing windings 30C and 31C which may be double layer field windings of the concentric type, for example. The horn-like members 29C provide paths for magnetic flux from the magnetic members 27A, 27B, 27C, 27A', 27B' and 27C' to axial yoke members 32 secured on opposite sides of the housing 10, for all positions of the magnetic members within the range of pole pitch adjustment contemplated for the apparatus.

Following good engineering practice, the magnetic members 27A, 27B, 27C, 27A', 27B' and 27C' should be made of stacked laminations disposed substantially perpendicular to the rotational axis. Further, the axial yoke members 32 should preferably be electrically insulated from the magnetic members as by very narrow air gaps 33, for example. The ring-like members should also be slotted as at 41 in Fig. 2 and insulated from the housing 10 so as to prevent any ring-like member from constituting a short-circuited turn for axial flux through the rotor. Also, a relatively wide air gap should be provided between the horn-like member 29C of a ring-like member and the adjacent edge of the opposite magnetic member 27C so as to render the two opposite magnetic members 27C magnetically independent.

The ring-like members 26A, 26B, 26C, 26A', 26B', 26C' are mounted in the housing 10 for rotation about the rotational axis of the machine. A suitable mounting might comprise, for example, flanged roller bearings 34, 34A, 34B, 34C, 34A', 34B' and 34C' mounted on common shafts 60, four sets of such bearings located 90° apart being shown in Fig. 2. The roller bearings may be enclosed by a suitable housing 35 secured to the motor housing 10 in any suitable manner as by cap screws 36, for example.

The rotor 18 comprises a plurality of stacked annular radial laminations 61 within which is disposed axially extending magnetic yoke means comprising a plurality of stacked axial laminations 37 mounted between ribs 38 secured on the shaft 17. The annular laminations 61 should be slotted as at 39 so as to prevent any lamination from forming a short-circuited ring for axial flux through the rotor, and the slots and adjacent laminations should be staggered to allow flux to pass annularly around the rotor beneath the rotor windings. Also, suitable means such as a narrow air gap or thin insulating material 62 should be placed between the axial laminations 37 and the annular laminations 61, so as to prevent two sets of laminations from short-circuiting each other. A narrow air gap may be maintained between the laminations 61 and 37 by placing strips of insulating material 40 between each of the ribs 38 and the annular laminations 61. These insulating strips 40 will also serve to prevent the ribs 38 from shorting the annular laminations 61.

Adjustable speed is attained, according to the invention, by adjusting the pitch between the poles carried by the several ring-like members. To this end, external ring gears 42A, 42B, 42C, 42A', 42B' and 42C' are formed on the corresponding ring-like members as shown in Fig. 1. The ring gears 42A, 42B and 42C are adjusted to be driven by corresponding bevel gears 43A, 43B and 43C of progressively greater diameter mounted on a common hub 44 turning on a support 63. The hub 44 also carries a bevel gear 45 driven by a gear 46 on a shaft 47 which is adapted to be rotated by a reel 48, or other actuating member. The reel may be provided with finger holes 64 or the like to facilitate manual adjustment of the ring-like members.

Similarly, the gears 42C', 42B', 42A' are adapted to be driven in the opposite direction by corresponding bevel gears 43C', 43B' and 43A' of progressively greater diameter mounted on a common hub 49 mounted on a support 65. The hub 49 also carries a gear 50 which is also adapted to be driven by the gearing 46 on the shaft 47. It will be understood that rotation of the reel 48 by hand or by a belt or other suitable means will cause the pitch between adjacent poles to be adjusted as required to secure the desired speed of rotation for the motor.

It will be apparent from Fig. 1 that the two innermost ring-like members 26C and 26A' will receive the greatest displacement for any given rotation of the reel 48, whereas the endmost ring-like members 26A and 26C' receive the smallest displacement. Accordingly, rotation of the reel 48 results in adjusting the pitch between adjacent poles so as to form two oppositely skewed rows of poles, one row including the ring-like members 26A, 26B and 26C and the other row comprising the ring-like members 26A', 26B' and 26C'.

The opposed sets of windings 30C and 31C are connected in series in such fashion that the opposed poles on the ring-like member 26C will have the same instantaneous polarity, and the windings on the other ring-like members are similarly connected. Further, the windings on the ring-like members 26A, 26B and 26C, respectively, are connected to the three phases of a three phase source, as are the windings on the ring-like members 26A', 26B' and 26C', respectively.

In operation, the reel 48 is normally in the starting position with the pairs of poles carried by the several ring-like members in axial alignment. In this position, no voltage is induced in the conductors 19, since the stator flux does not link the rotor bars. Accordingly, in this position the motor is at rest. As the reel 48 is rotated from the starting position, each axial row of poles is divided into two rows which are skewed in opposite directions with respect to each other. Under these conditions, each row of poles produces a rotating magnetic field which induces currents in the rotor conductors 19 and causes the rotor 18 to run at a speed that is a function of the effective field rotational velocity as determined by the space angular pitch between successive phases and the inductive response of the rotor conductors.

The alternating current dynamo electric machine shown in Figs. 1 and 2 and described above has a negative sequence stator field component which is zero at zero skew, a maximum at one-half per unit skew and again zero at field unit skew. Although this field is comparatively small in magnitude, even at its maximum, it is responsible for energy losses which tend to reduce the efficiency of the machine. If desired, these losses can be substantially eliminated by providing means for cancelling out the rotor voltage produced by the stator negative sequence field component by inducing in the rotor another negative sequence voltage of equal magnitude and opposite phase, as shown schematically in Fig. 3.

In the schematic developed view shown in Fig. 3, a plurality of magnetic poles 71, 72, 73, 74, 75 and 76 are shown in a row extending axially of the rotor 18 with their poles faces facing the rotor and being spaced therefrom by a relatively narrow air gap. As in the form of the invention shown in Figs. 1 and 2, an axial magnetic yoke 77 is provided for yoking the poles 71–76, inclusive, together magnetically.

Mounted on the poles 71–76, inclusive, are the main field windings 78–83, inclusive, which are connected in series to the three phase mains L1, L2, L3, as shown. Also mounted on the poles 71–76, inclusive, either alongside or underneath the main windings 78–83, respectively, and in the same slots are a plurality of neutralizing windings 84–89, inclusive. These are connected in series but in opposite phase sequence to the main windings so as to produce a component of stator field rotating oppositely to the main field. This opposing rotating field is so polarized that it tends to cancel out the negative sequence component of the main field which exists at pole pitches less than full pole pitch.

The neutralizing field should be capable of adjustment as required to cancel out the negative sequence component of the main field at various skews. Accordingly, suitable means such as the shunt rheostats 90, 91 and 92 are provided for permitting adjustment of the neutralizing field strength.

Instead of mounting the neutralizing windings on the same poles as the main windings, as shown in Fig. 3, the former may be located on a separate stator disposed alongside the main stator and coupled to the single rotor 18. In such case, the stator carrying the neutralizing windings might be similar to the main stator except for the magnitudes of the magnetic fields developed thereby, and it might be made magnetic. The neutralizing stator would then be magnetically independent of the main stator since its function is merely to induce in the rotor a voltage of appropriate phase and magnitude to substantially cancel out the negative sequence component created by the main stator field at less than full skew.

Obviously, other means than the rheostats 90, 91 and 92 may be employed for controlling the strength of the neutralizing field. For example, the neutralizing windings may be energized directly from the line through a phase changing transformer. Alternatively, the neutralizing windings might be provided with taps which could be brought out so as to enable adjustment of the magnetic strength developed by them.

If desired, the neutralizing windings in Fig. 3 might be employed to cancel out undesirable harmonics generated by the main field at full skew, since there would be no negative sequence component in the main field which would require neutralization at that time. For this purpose, the neutralizing windings might be connected to a source of different frequency than that supplied by the mains L1, L2 and L3.

From the foregoing, it will be understood that the invention provides alternating current dynamo electric machinery which is capable of highly effective operation as an adjustable speed motor. By providing independent axial magnetic flux paths on the stator, adjustable annular flux is utilized in the operation of the rotor and transverse flux is substantially eliminated. As a result, the development of undesired components in the rotating magnetic field is inhibited; the rotary space rate of all field components, including both the effective rotary field rate and the average rate, is adjustable; the field flux couples or links only that portion of the rotor winding annularly between and beneath the phase poles of each group; and improved efficiency results.

As stated, care must be exercised to insure that none of the elements of the apparatus will constitute a shorted conductor around the axial flux path. Also, laminations disposed at right angles to each other should be insulated from each other by insulation or an air gap so as to prevent them from mutually short-circuiting each other.

It will be observed that as the angle of skew of the poles in Fig. 2 is decreased, the magnetic flux leakage axially of the rotor from any pair of poles tends to increase. If desired, compensation means such as a short-circuited winding 93 of figure 8 shape as shown in Figs. 4 and 5, may be used for example.

The exemplary embodiment described above and illustrated in the drawings is obviously susceptible of modification in form and detail within the spirit of the invention. For example, the invention is not limited to motors employing only two axial magnetic yokes with their associated rows of poles but any number of axially yoked groups of poles may be used, as desired.

Further, the rotor axial flux laminations might be placed in the bottoms of the slots for the rotor conductors, instead of the positions shown in Fig. 1. Other variations will be apparent to those skilled in the art. The specific embodiment disclosed herein, therefore, is not to be regarded as imposing any restrictions whatsoever upon the scope of the following claims.

I claim:

1. In alternating current dynamo electric machinery, the combination of a rotor, means forming a low reluctance, low eddy current loss, magnetic path extending longitudinally of said rotor, a plurality of conductors carried by said rotor and insulated therefrom, a plurality of magnetic poles disposed in a row extending longitudinally of said rotor, said poles having pole faces disposed adjacent said rotor and spaced therefrom by a relatively narrow air gap, windings for said respective poles, successive windings being adapted to be energized by successive phases of a polyphase source, means providing a low reluctance, low eddy current loss magnetic path extending longitudinally of said rotor and yoking said poles together magnetically, said rotor, poles and yoking means constituting a complete magnetic circuit which establishes substantially no magnetic flux linkages with said conductors when said windings are energized said poles are aligned parallel to said conductors, and means for moving said poles transversely of said rotor to adjust the pitch therebetween and skew said row relatively to the longitudinal axis of said rotor to cause the magnetic flux in said magnetic circuit to link at least some of said conductors.

2. In alternating current dynamo electric machinery, the combination of a rotor having a central core member formed of a plurality of longitudinally extending stacked laminations surrounded by a plurality of radially extending, noncontinuous annular laminations, a plurality of conductors carried by said rotor and insulated therefrom, a plurality of magnetic poles disposed in a row extending longitudinally of said rotor, said poles having pole faces disposed adacent said rotor and spaced therefrom by a relatively narrow air gap, windings for said respective poles, successive windings being adapted to be energized by successive phases of a polyphase source, a yoke member formed of stacked, longitudinally extending laminations extending longitudinally of said rotor and yoking said poles together magnetically, said rotor, magnetic poles and yoke member constituting a complete magnetic circuit which establishes substantially no magnetic flux linkages with said conductors when said windings are energized and said poles are aligned parallel to said conductors, and means for moving said poles transversely of said rotor to adjust the pitch therebetween and skew said row relatively to the longitudinal axis of said rotor to cause the magnetic flux in said magnetic circuit to link at least some of said conductors.

3. In combination, a plurality of pairs of opposed magnetic poles, the poles of each pair being magnetically independent and separated by a relatively large air gap and the pairs of poles being disposed parallel to one another with their air gaps in alignment, a plurality of windings associated with said respective magnetic poles, for establishing magnetic fluxes in the air gaps thereof, respectively, successive windings being adapted to be energized by successive phases of a polyphase source, conductor means having elemental portions lying in said air gaps, respectively, means mounting said conductor means for relative movement with respect to said magnetic poles, means associated with said conductor means and movable therewith for forming a magnetic flux path in the direction of said conductor means, means magnetically coupled with said magnetic poles and forming at least one magnetic flux path in the direction of said conductor means, and means for facilitating adjustment of the space phases of said magnetic fluxes relatively to each other.

4. In a polyphase alternating current dynamo electric machine, the combination of a housing, a plurality of ring-like members rotatably mounted in the housing each carrying at least two magnetically independent poles separated by an air gap, said poles of each ring forming with corresponding poles of other rings at least two separate rows of poles, windings for each of said poles, successive windings being adapted to be energized by successive phases of a polyphase alternating current source, a rotor mounted in the housing for rotation between said cooperating poles and spaced therefrom by a narrow air gap, elongated conductors on said rotor, means forming at least one axial magnetic flux path along said rotor, means cooperating with said ring-like members to form at least one independent axial magnetic flux path for each of said rows of poles along said housing, and means for rotating adjacent ring-like members relatively to one another to adjust the space phases between adjacent pairs of poles so as to produce a rotating magnetic field about the axis of said rotor.

5. A polyphase alternating current dynamo electric machine as in claim 6 further characterized by means for inhibiting eddy current losses in said ring-like members.

6. A rotor for a polyphase alternating current dynamo electric machine of the axial flux type comprising a core member of circular cross-section formed of a plurality of axially extending laminations stacked radially about the axis of the core member, a plurality of annular laminations concentrically surrounding said core member and stacked transversely to said axis, and means for providing a short high reluctance path between said core member and said annular laminations to prevent short-circuiting between said annular laminations and said axially extending laminations.

7. A rotor as in claim 6 in which the annular laminations are radially slotted to inhibit eddy current losses, the slots of adjacent annular laminations being staggered in radial position.

8. In a polyphase alternating current dynamo electric machine, the combination of a housing, a plurality of ring-like members rotatably mounted in the housing each carrying at least two magnetically independent poles separated by an air gap, windings for each of said poles, successive windings being adapted to be energized by successive phases of a polyphase alternating current source, a rotor mounted in the housing for rotation between said cooperating poles and spaced therefrom by a narrow air gap, said rotor comprising a central core formed of a plurality of longitudinally extending stacked laminations surrounded by a plurality of radially extending, noncontinuous, annular laminations, elongated conductors on said rotor, at least one yoke member formed of stacked, longitudinally extending laminations extending longitudinally of said rotor and yoking one group of said poles together magnetically, and means for rotating adjacent ring-like members relatively to one another to adjust the space phases between adjacent pairs of poles so as to produce a spirally moving magnetic field about the axis of said rotor.

9. In alternating current dynamo electric apparatus, the combination of an elongated member made of magnetic material, conductor means carried by said member and extending longitudinally thereof, a plurality of magnetic poles disposed in a row extending longitudinally of said member, said poles having pole faces disposed adjacent said member and spaced therefrom by a relatively narrow air gap, windings for said respective poles, successive windings being adapted to be energized by the successive phases of a polyphase source, controllable auxiliary field winding means for inducing in said conductor means a voltage of proper phase and magnitude to cancel any negative sequence voltage developed in said conductor means, means extending longitudinally of said member for yoking said poles together magnetically, said member, poles and yoking means constituting a complete magnetic circuit which establishes substantially no magnetic flux linkages with said conductor means when said windings are energized and said poles are aligned parallel to said conductor means, means permitting adjustment of the pitch between said poles transversely of said member to cause the magnetic flux in said magnetic circuit to link said conductor means, and means mounting said member and said magnetic poles for relative movement therebetween.

10. In alternating current dynamo electric apparatus, the combination of an elongated member made of magnetic material, conductor means carried by said member and extending longitudinally thereof, a plurality of magnetic poles disposed in a row extending longitudinally of said member, said poles having pole faces disposed adjacent said member and spaced therefrom by a relatively narrow air gap, windings for said respective poles, successive windings being adapted to be energized by the successive phases of a polyphase source, controllable auxiliary field winding means for inducing in said conductor means a voltage of proper frequency, phase and magnitude to cancel any voltage of undesired frequency developed in said conductor means, means extending longitudinally of said member for yoking said poles together magnetically, said member, poles and yoking means constituting a complete magnetic circuit which establishes substantially no magnetic flux linkage with said conductor means when said windings are energized and said poles are aligned parallel to said conductor means, means permitting adjustment of the pitch between said poles transversely of said member to cause magnetic flux in said magnetic circuit to link said conductor means, and means mounting said member and said magnetic poles for relative movement therebetween.

11. In alternatiing current dynamo electric apparatus, the combination of an elongated member made of magnetic material, conductor means carried by said member and extending longitudinally thereof, a plurality of magnetic poles disposed in a row extending longitudinally of said member, said poles having pole faces disposed adjacent said member and spaced therefrom by a relatively narrow air gap, first windings for said respective poles, successive windings being adapted to be energized by the successive phases of a polyphase source, second windings for said respective poles, successive second windings being adapted to be energized by a polyphase source so as to develop a magnetic field having negative phase sequence of propagation along said row of poles, means facilitating adjustment of the intensity of said negative sequence field, means extending longitudinally of said member for yoking said poles together magnetically, said member, poles and yoking means constituting a complete magnetic circuit which establishes substantially no magnetic flux linkage with said conductor means when said windings are energized and said poles are aligned parallel to said conductor means, means permitting adjustment of the pitch between said poles transversely of said member to cause magnetic flux in said magnetic circuit to link said conductor means, and means mounting said member and said magnetic poles for relative movement therebetween.

12. In alternatiing current dynamo electric apparatus, the combination of a member made of magnetic material, conductor means carried by said member, a plurality of magnetic poles disposed in a row extending longitudinally of said conductor means, said poles having pole faces disposed adjacent said member and spaced therefrom by a relatively narrow air gap, windings for said respective poles, successive windings being adapted to be energized by the successive phases of a polyphase source, means extending longitudinally of said conductor means for yoking said poles together magnetically, said member, poles and yoking means constituting a complete magnetic circuit which establishes substantially no magnetic flux linkage with said conductor means when said windings are energized and said poles are aligned parallel to said conductor means, means permitting adjustment of the pitch between said poles transversely of said conductor means to cause magnetic flux in said magnetic circuit to link said conductor means, means mounting said member and said magnetic poles for relative movement therebetween, and auxiliary windings means on said poles for reducing magnetic leakage between pairs of said poles as a function of the pitch between said poles.

References Cited in the file of this patent

UNITED STATES PATENTS

| Number | Name | Date |
|---|---|---|
| 1,514,474 | Stewart | Nov. 4, 1924 |
| 2,470,767 | Ellis | May 24, 1949 |

FOREIGN PATENTS

| Number | Country | Date |
|---|---|---|
| 10,970 | Great Britain | 1910 |
| 430,666 | Great Britain | June 24, 1935 |